Patented Jan. 13, 1925.

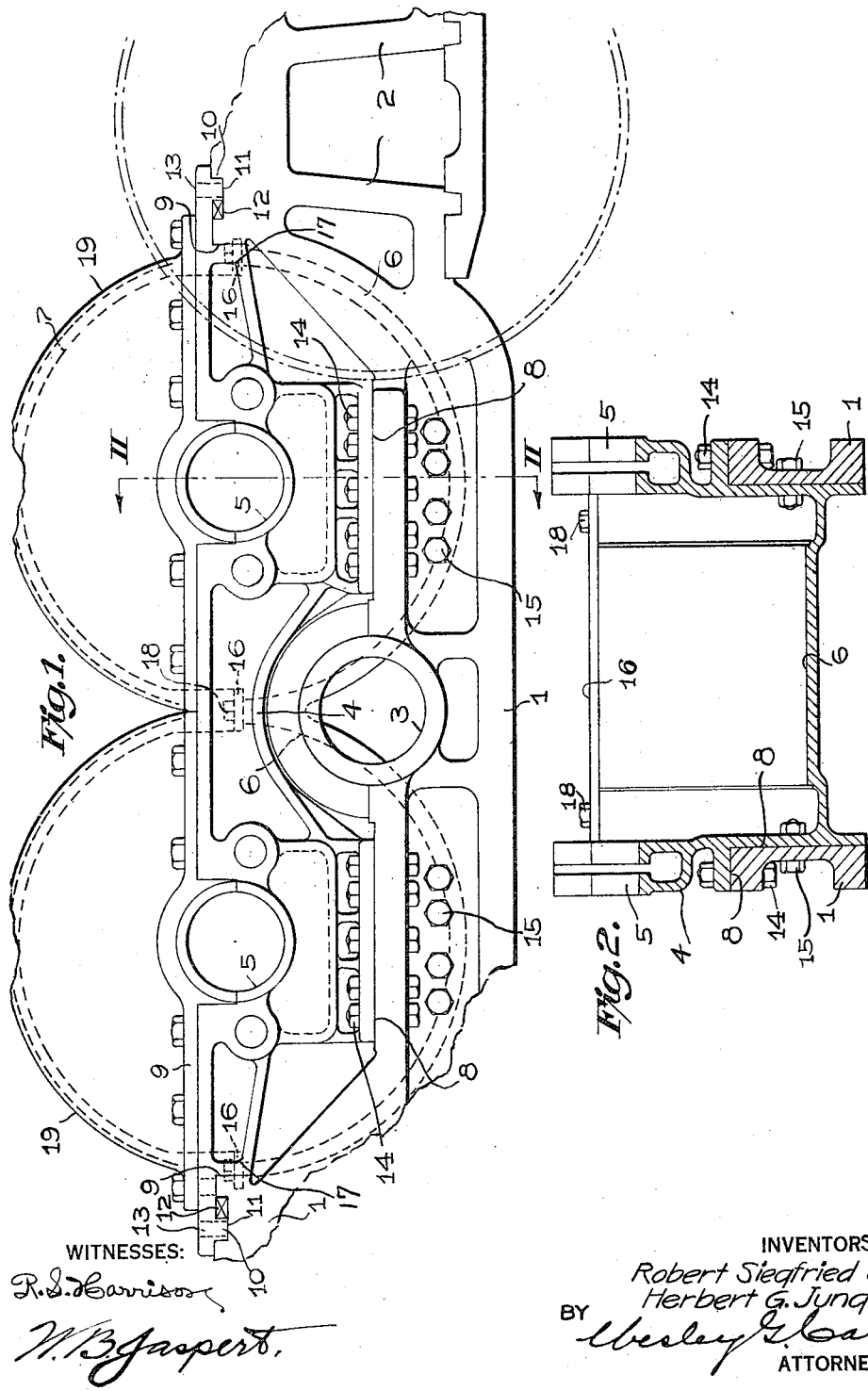

1,522,753

UNITED STATES PATENT OFFICE.

ROBERT SIEGFRIED AND HERBERT G. JUNGK, OF PITTSBURGH, PENNSYLVANIA, ASSIGNORS TO WESTINGHOUSE ELECTRIC AND MANUFACTURING COMPANY, A CORPORATION OF PENNSYLVANIA.

LOCOMOTIVE FRAME.

Application filed January 13, 1922. Serial No. 528,922.

*To all whom it may concern:*

Be it known that we, ROBERT SIEGFRIED, a citizen of the United States, and a resident of Pittsburgh, in the county of Allegheny and State of Pennsylvania, and HERBERT G. JUNGK, a citizen of the United States, and a resident of Pittsburgh, in the county of Allegheny and State of Pennsylvania, have invented a new and useful Improvement in Locomotive Frames, of which the following is a specification.

Our invention relates to electrical locomotives, more especially to means for mounting motors on the locomotive side frames.

It is among the objects of this invention to provide a unitary motor cradle-frame mounting for a pair of twin motors driving a common jackshaft which shall be of light, durable and rigid construction.

Another object of this invention is to provide a mounting which shall maintain a fixed center distance between the motor journal bearings and the jackshaft and which may be disassembled without altering the relative positions of said bearings and jackshaft.

A further object of our invention is to provide a locomotive side-frame and motor-cradle-frame construction which shall comprise a rigid, unitary structure to prevent distorting of the bearing alignment of the motors mounted thereon and which shall permit flexing of the side frames between two adjacent cradle frames.

It has been customary practice, in mounting a twin motor jackshaft drive for electrical locomotives, to secure the motor frames directly to the side frames by suspending them on pedestals which are mounted independently of each other. This method of mounting has been the cause of difficulties resulting from the shifting or disalignment of the assembled parts which are frequently the cause of more serious trouble to the gear drives.

In our present invention, we propose to provide a rigid, twin-motor cradle frame mounting which is secured to the locomotive side frames to produce a rigid, reinforced structure in which the journal bearings maintain a fixed center distance and which are not distorted by external stresses imposed upon the side frames.

In electric locomotives of the larger types, two sets of motor drives are spaced in such manner that, with our improved design, the portion of the side frames in which the motors are mounted will be rigid and the intervening space or frame will be flexible and may be reinforced by suitable cross ties to obtain any degree of rigidity.

In the accompanying drawing constituting a part hereof, in which like reference characters designate like parts, Figure 1 is a side elevational view of a portion of a locomotive frame having the motor cradle frame mounted thereon; and Fig. 2 is a cross-sectional view thereof, taken along the line II—II of Fig. 1.

As shown in Fig. 1, a portion 1 of a locomotive side frame is provided with a plurality of pedestals 2 for mounting the journal boxes of the wheel shafts. The side frames are further provided with jackshaft journals 3 for mounting a jackshaft transversely thereon, and a twin-motor cradle frame 4, provided with pairs of journals 5 and having a double semi-circular base 6 concentric with the journals 5 for mounting a pair of motor stators 7, is seated on the machined surfaces 8 and 9 of the frame 1.

The cradle frame 4 is machined before mounting it upon the side frames 1, and the journals 5 and the seats 8 and 9 are accurately machined to provide suitable spacing between the journals 5 and the jackshaft journals 3. The semi-circular base 6 is machined along its entire inner surface (Fig. 2) to provide accurate seats for the stators 7. The extending portions of the motor frames 4, having projecting lugs 10, are fitted into correspondingly shaped slots 11 in the side frames and all secured therein by wedges 12 to ensure the seating of the motor frame along the machined surface 9. The top of the frame 4 is secured to the side frames by bolts 13 and is further secured along the sides and top of the side frames by a plurality of bolts 14 and 15.

The stators 7 are secured to the motor cradle frame 4 by dogs 16 which are secured thereto at the intersection of the bases 6 and at their notched outer edges 17 by suitable cap bolts 18. A suitable cover 19 may be mounted on the motor frame 4 to enclose the stators 7 for protection against dust, moisture, oil and grease and also to stiffen the entire structure.

The jackshaft center is located from the center of the journals 5 after the cradle 4 has been secured to the frame. A pair of mandrels are disposed in the journals 5 from which the jackshaft center is located for machining, and, in this manner, an accurate center distance is assured, which will be maintained at all times, even though the stators and rotors of the motors are removed for replacement.

It will be understood from the above description that the motor cradle frame 4 provides a rigid connection between the locomotive side frames 1, thereby ensuring a fixed relation between the various journal-bearing mountings and also greatly facilitating the machining and the assembling of the motor parts, in that all the parts are simple and easily accessible. The frames 1 are standard locomotive side-frame castings, and the motor frame 4 consists of a single steel casting which constitutes a part of the side-frame support, as well as the motor casing.

Although we have described a specific embodiment of our invention, it will be obvious to those skilled in the art that various modifications may be made in the details of construction without departing from the principles herein set forth. For instance, the side frames and motor frames may be designed in various ways to provide suitable seating surfaces, depending upon the size and design of the motors and the length of wheel base of the locomotive. The method of aligning and securing the motor frame may likewise be changed and various methods of, and means for, reinforcing the side frames or the motor-frame castings, as by suitable webs or cross-ties, may be employed.

We claim as our invention:

1. The combination with a pair of locomotive side frames, of an integral tie-rod comprising a motor cradle frame disposed transversely thereof and seated at each of its opposite ends on one of the side frames, the ends of said cradle frame constituting portions of the locomotive side frames.

2. The combination with a pair of locomotive side frames, of an integral tie-rod comprising a motor cradle frame disposed transversely thereof and secured at each of its opposite ends on one of the side frames, the ends of said cradle frame constituting portions of the locomotive side frames.

3. The combination with a pair of locomotive side frames, of an integral tie-rod comprising a motor cradle frame disposed transversely thereof and seated and secured at each of its opposite ends on one of the side frames, the ends of said cradle frame constituting portions of the locomotive side frame.

4. The combination with a pair of locomotive side frames, of a motor cradle frame disposed transversely thereof and seated and secured at each of its opposite ends on one of the side frames, said cradle frame constituting a cross tie between said side frames, and the ends thereof constituting portions of the said side frames.

5. The combination with a pair of locomotive side frames, of a motor cradle frame disposed transversely thereof and seated and secured at each of its opposite ends on one of the side frames, said cradle frame constituting a rigid support between said side frames, and the ends thereof constituting portions of the said side frames.

6. The combination with a pair of locomotive side frames, of a motor cradle frame disposed transversely thereof and seated and secured at each of its opposite ends on one of the side frames, said cradle frame having integral side frame portions constituting a part of the locomotive side frames.

7. The combination with a pair of locomotive side frames having a jackshaft journal, of a motor cradle frame disposed transversely thereof and having a plurality of motor bearing journals symmetrically disposed on both sides of said jackshaft journal, a cover disposed on said motor cradle frame, said cover being secured to the sides of said cradle frame to form a unitary structure having a fixed center distance between said journals.

In testimony whereof, we have hereunto subscribed our names this 10th day of January, 1922.

ROBERT SIEGFRIED.
HERBERT G. JUNGK.